US010262140B2

(12) United States Patent
Smith et al.

(10) Patent No.: US 10,262,140 B2
(45) Date of Patent: Apr. 16, 2019

(54) METHODS AND APPARATUS TO FACILITATE BLOCKCHAIN-BASED BOOT TRACKING

(71) Applicant: Intel Corporation, Santa Clara, CA (US)

(72) Inventors: Ned M. Smith, Beaverton, OR (US); Rajesh Poornachandran, Portland, OR (US); Vincent J. Zimmer, Federal Way, WA (US)

(73) Assignee: Intel Corporation, Santa Clara, CA (US)

( * ) Notice: Subject to any disclaimer, the term of this patent is extended or adjusted under 35 U.S.C. 154(b) by 61 days.

(21) Appl. No.: 15/279,761

(22) Filed: Sep. 29, 2016

(65) Prior Publication Data
US 2018/0089436 A1    Mar. 29, 2018

(51) Int. Cl.
*G06F 21/57* (2013.01)
*H04L 9/32* (2006.01)

(52) U.S. Cl.
CPC .......... *G06F 21/575* (2013.01); *H04L 9/3234* (2013.01); *H04L 9/3236* (2013.01); *H04L 2209/38* (2013.01); *H04L 2209/56* (2013.01)

(58) Field of Classification Search
CPC ..... G06F 21/575; G06F 9/4416; H04L 9/3234
See application file for complete search history.

(56) References Cited

U.S. PATENT DOCUMENTS 7,200,758 B2    4/2007  Zimmer
8,042,190 B2   10/2011  Sahita et al.
8,086,839 B2   12/2011  Yao et al.
8,201,239 B2    6/2012  Smith et al.
8,726,364 B2    5/2014  Smith
(Continued)

FOREIGN PATENT DOCUMENTS

WO    2013/0101081 A1    7/2013

OTHER PUBLICATIONS

AICPA, SOC "SAS 70, SSAE 16 and SOC Comparison", retrieved from <http://www.onlinetech.com/resources/references/sas-70-ssae-16-and-soc-comparison> on Sep. 1, 2016, 4 Pages.
(Continued)

*Primary Examiner* — Austin Hicks
(74) *Attorney, Agent, or Firm* — Barnes & Thornburg LLP

(57) ABSTRACT

A device with support for blockchain-based boot tracking comprises at least one processor, non-volatile storage responsive to the processor, and at least one boot module in the non-volatile storage. The boot module, when executed by the processor, enables the device to generate a measurement of the boot module, generate an internal ledger transaction based on the measurement of the boot module, and send the internal ledger transaction to a remote device. In addition, the boot module enables the device to (a) receive an external ledger transaction from the remote device, wherein the external ledger transaction is based on a measurement for a boot module of the remote device; (b) in response to receiving the external ledger transaction, verify the external ledger transaction; and (c) in response to verifying the external ledger transaction, add the external ledger transaction to a boot audit blockchain. Other embodiments are described and claimed.

22 Claims, 5 Drawing Sheets

(56) References Cited

U.S. PATENT DOCUMENTS

| | | | |
|---|---|---|---|
| 8,832,454 | B2 | 9/2014 | Khosravi et al. |
| 8,984,265 | B2 | 3/2015 | Vaid et al. |
| 9,158,920 | B2 | 10/2015 | Zimmer et al. |
| 2003/0074548 | A1* | 4/2003 | Cromer .............. G06F 21/575 713/1 |
| 2008/0126779 | A1 | 5/2008 | Smith |
| 2009/0129597 | A1 | 5/2009 | Zimmer et al. |
| 2010/0082960 | A1 | 4/2010 | Grobman et al. |
| 2015/0271297 | A1 | 9/2015 | Zimmer et al. |
| 2016/0085995 | A1 | 3/2016 | Poornachandran et al. |
| 2018/0054491 | A1* | 2/2018 | Mankovskii ........ H04L 67/2804 |

OTHER PUBLICATIONS

Bitcoin, Wiki, "Block Chain", retrieved from <https://en.bitcoin.it/wiki/Block_chain> on Sep. 8, 2016, 2 Pages.

Dinh et al. "Trusted Computing: TCG Proposals", retrieved from <https://www.cs.bham.ac.uk/~mdr/teaching/modules/security/lectures/TrustedComputingTCG.html> on Sep. 8, 2016, 9 Pages.

Hardjono et al., "Cloud-Based Commissioning of Constrained Devices Using Permissioned Blockchains", retrieved from <http://dx.doi.org/10.1145/2899007.2899012>, published on May 30, 2016, 8 Pages.

Jan, Monsch, Google Security Engineer, "Proposal for Improving Firmware Security in the Industry", video published on <www.youtube.com/watch?v=uvoEAkfhXNY> on Jun. 29, 2016 by coreboot.org; screenshot (from the beginning of the video) captured Sep. 29, 2016; 1 Page.

NDB, LLP "SOC 2 Compliance and 5 Important Things You Need to Know", retrieved from <http://www.ssae16.org/white-papers/soc-2-compliance.html> on Sep. 1, 2016, 3 Pages.

Poornachandran et al., "Drone Control Registration", U.S. Appl. No. 15/088,949, filed Apr. 1, 2016, 41 Pages.

Poornachandran et al., "System, Apparatus and Method for Transferring Ownership of a Smart Delivery Package", U.S. Appl. No. 14/977,753, filed Dec. 22, 2016, 46 Pages.

Segall, Ariel, "Using the TPM: Machine Authentication and Attestation", retrieved from <http://opensecuritytraining.info/IntroToTrustedComputing_files/Day2-1-auth-and-att.pdf>, 46 Pages.

Smith et al., "Blockchain System With Nucleobase Sequencing As Proof of Work ", U.S. Appl. No. 15/179,986, filed Jun. 11, 2016, 44 Pages.

Smith et al., "Public Key Infrastructure Using Blockchains", U.S. Appl. No. 15/201,219, filed Jul. 1, 2016, 47 Pages.

Smith et al., "Technologies for Secure Boot Provisioning and Management of Field-programmable Gate Array Images", U.S. Appl. No. 15/267,322, filed Sep. 16, 2016, 39 Pages.

Smith Rod, "Managing EFI Boot Loaders for Linux: Dealing with Secure Boot", retrieved from <http://www.rodsbooks.com/efi-bootloaders/secureboot.html>, published on Nov. 4, 2012, 18 Pages.

Trusted Computing Group (TCG), "Glossary", retrieved from <http://www.trustedcomputinggroup.org/wp-content/uploads/TCG_Glossary_Board-Approved_12.13.2012.pdf>, published on Dec. 13, 2012, 6 Pages.

Wikipedia, "Blockchain (database)", retrieved from <https://en.wikipedia.org/wiki/Blockchain_(database)> on Sep. 1, 2016, 9 Pages.

Wikipedia, "Statement on Auditing Standards No. 70: Service Organizations", retrieved from <https://en.wikipedia.org/wiki/Statement_on_Auditing_Standards_No._70:_Service_Organizations> on Sep. 1, 2016, 6 Pages.

Wikipedia, "Trusted Platform Module", retrieved from <https://en.wikipedia.org/wiki/Trusted_Platform_Module> on Sep. 8, 2016, 7 Pages.

Wikipedia, "Unified Extensible Firmware Interface", retrieved from <https://en.wikipedia.org/wiki/Unified_Extensible_Firmware_Interface#UEFI_booting> on Sep. 13, 2016, 17 Pages.

Yao et al., "Techniques for Coordinating Device Boot Security", PCT Application No. PCT/CN2015/098651, filed on Dec. 24, 2015, 64 Pages.

* cited by examiner

METHODS AND APPARATUS TO FACILITATE BLOCKCHAIN-BASED BOOT TRACKING

TECHNICAL FIELD

This disclosure pertains in general to security for data processing systems, and in particular to methods and apparatus to facilitate blockchain-based boot tracking.

BACKGROUND

A blockchain is a database consisting of two or more block records that are linked together and that adhere to a predetermined standard or protocol. For brevity, block records may be referred to as "blocks." Each block is a data structure that contains a payload and a link to the previous block. However, the link to the previous block may be omitted from the initial block (which may also be referred to as the "genesis block"). According to a typical blockchain protocol, a block also includes a hash value for the payload and a proof of work (POW), possibly along with other hash values or other types of data. Data items such as the link to the previous block, the POW, and the hash of the payload may be collected into a block header. The payload may include one or more transaction records. For brevity, transaction records may be referred to as "transactions." Each transaction may be timestamped and digitally signed by the device which created it. After a device creates a transaction, the device may send it to other block chain peers via the Internet, the "cloud," or any other suitable connection.

Bitcoin, for instance, is a popular blockchain implementation or protocol in which each block has a header with a hash for the previous block. The headers thus link the blocks into a chain. Each Bitcoin block also has a payload. That payload typically documents one or more financial transactions. Accordingly, a blockchain may be used as a distributed ledger of transactions.

A blockchain may be considered a "distributed" database because multiple different data processing systems may obtain copies of the blockchain, and multiple different data processing systems (DPSs) may update the blockchain. For instance, a blockchain may be made available to the public via the Internet, and DPSs may update the blockchain by creating a new block for the end of the blockchain and publishing that block to other nodes. A DPS that adds blocks to a blockchain (or that attempts to do so) may be referred to as a "miner."

A blockchain may include all valid blocks that have ever been created. Accordingly, a blockchain may contain a set of data records that is continuously growing, with each record referring to at least one previous record on the set. A blockchain may thus be hardened against tampering and revision. The miners and other nodes which cooperate to maintain and build a particular blockchain may be referred to as a "blockchain system." Each node in a blockchain system may include a copy of the entire blockchain or a portion of the blockchain.

When a DPS is started or restarted, it may need to perform various configuration operations before it can do useful work. Such configuration operations may be referred to in general as a "boot process." In addition, booting is typically a fully automated process. For instance, when a network server is started or restarted, it may need to load a certain sequence of software modules and it may need to process other configuration data before it can process network traffic. Once the network server has successfully completed the boot process, the network server may be ready to perform useful work (e.g., handling network traffic).

In many situations, security of the boot process is an important concern. For instance, an attacker might be able to hijack a DPS by altering the firmware or other configuration data for that DPS.

As described in greater detail below, the present disclosure describes methods and apparatus to facilitate blockchain-based boot tracking for DPSs.

DESCRIPTION OF EMBODIMENTS

As indicated above, security of the boot process of a DPS may be an important concern. For instance, an organization may want to make sure that the firmware in its DPSs is trustworthy. The organization may even adopt an integrity policy which requires proof that DPSs have booted using only trustworthy firmware. For example, the organization may be subject to auditing standards such as those set forth under the name "Statement on Auditing Standards No. 70" (SAS 70).

Accordingly, as part of the boot process, a DPS may automatically measure each firmware module that is used during the boot process, and the DPS may automatically compare those measurements with known good measurements, to make sure that all of the modules are trustworthy. Such a process of measurement and verification may be referred to as a "trusted boot" process. For example, a DPS may include a trusted platform module (TPM). A TPM may include platform configuration registers (PCRs) and other secure storage. The known good measurements may be stored in the secure storage. The secure storage may also be used to store sensitive data or "secrets," such as keys and credentials.

To collect evidence of boot integrity, the DPS may use the PCRs to automatically record measurements of some or all of the firmware modules used during the boot process. Additionally, boot paths, and boot integrity paths, may extend past the firmware modules and into the software modules for higher-level components (e.g., for an operating system (OS), for a hypervisor, etc.). For purposes of this disclosure, data which reflects how the configuration of a device has changed during that device's boot process may be referred to as "boot audit data."

However, one limitation of a TPM-based integrity measurement is that the lifetime of the boot audit data in the TPM may be too short to satisfy integrity compliance requirements. A TPM resets PCRs at each power cycle. Hence, simply rebooting the DPS can cause the boot audit data to be reset or lost. As described in greater detail below, the present disclosure describes methods and apparatus which use one or more blockchains to provide a persistent record of boot audit data. In other words, a DPS according to the present disclosure may use blockchain-based boot tracking.

Figure 1:
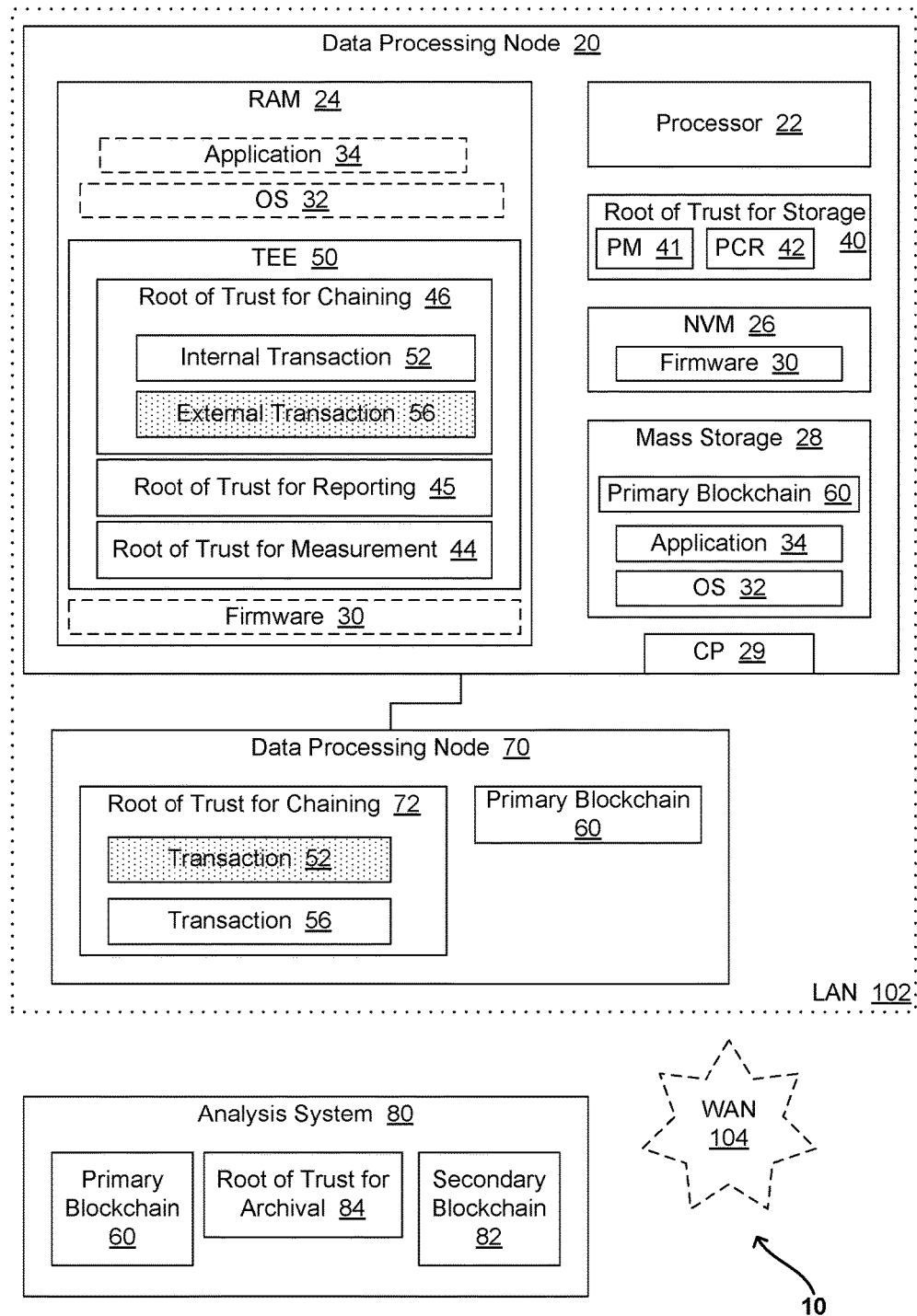
FIG. 1 is a block diagram of an example embodiment of a distributed computing system that provides for blockchain-based boot tracking.

FIG. 1 is a block diagram of an example embodiment of a distributed computing system (DCS) 10 that provides for blockchain-based boot tracking. In the illustrated embodiment, DCS 10 includes a data process node 20 and a data processing node 70 which can communicate with each other over a local area network (LAN) 102. DCS 10 also includes an analysis system 80 that can communicate with node 20 and node 70 via a wide area network (WAN) 104. WAN 104, which may include nodes 20 and 70, analysis system 80, and other devices, is illustrated in FIG. 1 as a star with a dashed outline, to reflect the relatively amorphous nature of a typical WAN. Analysis system 80 may also be referred to as an "analyzing device."

As described in greater detail below, nodes 20 and 70 cooperate to create a primary blockchain 60 that tracks the boot process for each node. Accordingly, primary blockchain 60 may also be referred to as a "boot audit blockchain" 60. In addition, analysis system 80 monitors primary blockchain 60 and creates at least one secondary blockchain 82 to provide a persistent and distributed record of conclusions reached by the analysis process. Accordingly, secondary blockchain 82 may also be referred to as "analysis blockchain" 82. Also, any node may include a complete copy of each blockchain or a portion of each blockchain (e.g., the tail end containing a predetermined number of the most recently added blocks). For purposes of this disclosure, the nodes that cooperate to generate primary blockchain 60 (e.g., nodes 20, 70, and 80) may be referred to collectively as a "blockchain network." Also, the nodes in the blockchain network that communicate with each other via LAN 102 may be referred to as a "local blockchain network."

However, the present teachings are not limited to the illustrated example, but may be used to advantage in a wide variety of different environments. For instance, an alternative embodiment may omit the analysis system. Alternatively, a DCS may include additional nodes and additional analysis systems. Some embodiments may include dozens or hundreds of nodes in a LAN. Some embodiments may use different types of network connections to connect one or more nodes to one or more other nodes. Some embodiments may use different types of network connections to connect one or more of the nodes to other nodes, or to connect analysis systems to nodes. Accordingly, the present teachings may be used to audit and document the boot process (a) for each of the servers on a server rack; (b) for nodes integrated into appliances or other hardware, in a DCS designed to monitor and control appliances and other devices in a house; (c) for nodes which process data in a motor vehicle; and (d) for a wide variety of other environments or implementations.

In the embodiment of FIG. 1, node 20 includes at least one processor 22 and various other components responsive to processor, such as random access memory (RAM) 24, non-volatile memory (NVM) 26, mass storage 28, a root of trust for storage (RTS) 40, at least one communication port (CP) 29 for communicating with other nodes, etc. RTS 40 may be implemented as a security module such as a TPM. RTS 40 may include non-volatile persistent memory (PM) 41 and at least one platform configuration register (PCR) 42. Node 70 may include the same or similar components as node 20, as may analysis system 80.

In node 20, mass storage 28 includes an operating system (OS) 32 and one or more applications 34. NVM 26 includes firmware 30 that processor 22 automatically executes to boot node 20 to OS 32. Firmware 30 may include a set of sequence of firmware modules. Additional details about how those modules may be measured during the boot process are provided below, after the following general outline.

In brief, processor 22 may automatically copy at least some of firmware 30 to RAM 24, and processor 22 may then automatically execute firmware 30 from RAM 24, to configure node 20 with an operating environment that enables OS 32 to run. To illustrate the relatively transient nature of firmware 30 in RAM 24, firmware 30 is illustrated with a dashed outline. For purposes of this disclosure, the portion of the boot process that precedes the launching of the OS may be referred to as the "firmware boot process." Similarly, the environment within node 20 that is established during the firmware boot process may be referred to as the "firmware environment."

The end of the firmware boot process may involve copying at least some of OS 32 into RAM 24 and then passing control from firmware 30 to OS 32. Accordingly, OS 32 is illustrated with a dashed outline in RAM 24. The portion of the boot process that starts with launching the OS may be referred to as the "OS boot process." Once OS 32 is launched, OS 32 may automatically load various drivers and perform other operations to configure node 20 with an operating environment that enables application 34 to run. The environment within node 20 that is established during the OS boot process may be referred to as the "OS environment."

After the OS boot process has finished, or towards the end of the OS boot process, OS 32 may copy application 34 into RAM 24, and OS 32 may then launch application 34. Accordingly, application 34 is illustrated with a dashed outline in RAM 24. As illustrated, OS 32 may thus execute on top of firmware (i.e., on top of the firmware environment), and application 34 may thus execute on top of OS 32 (i.e., on top of the OS environment).

Figure 2A:
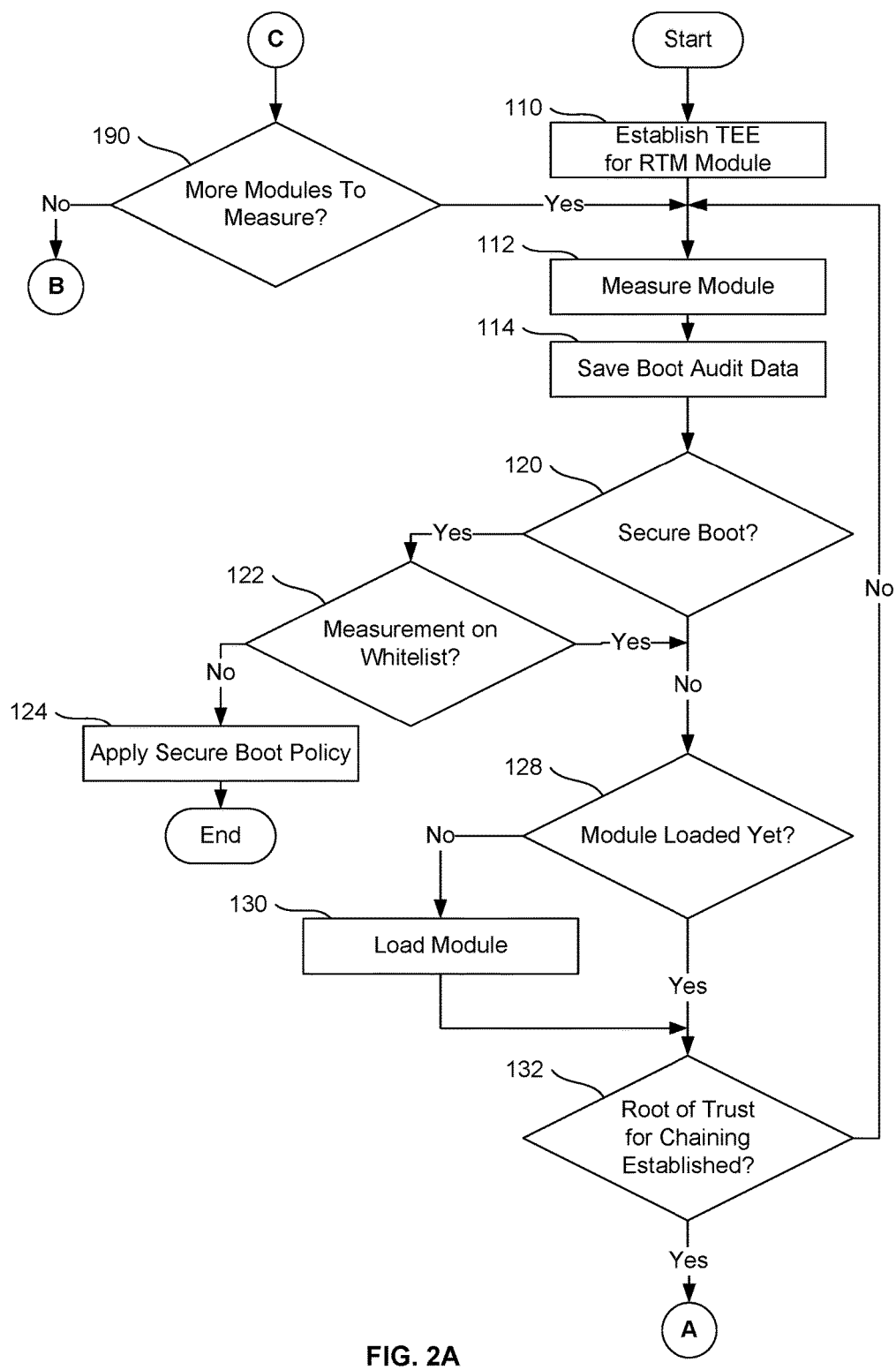
FIGS. 2A through 2C present a flowchart of an example process for blockchain-based boot tracking.
Figure 2B:
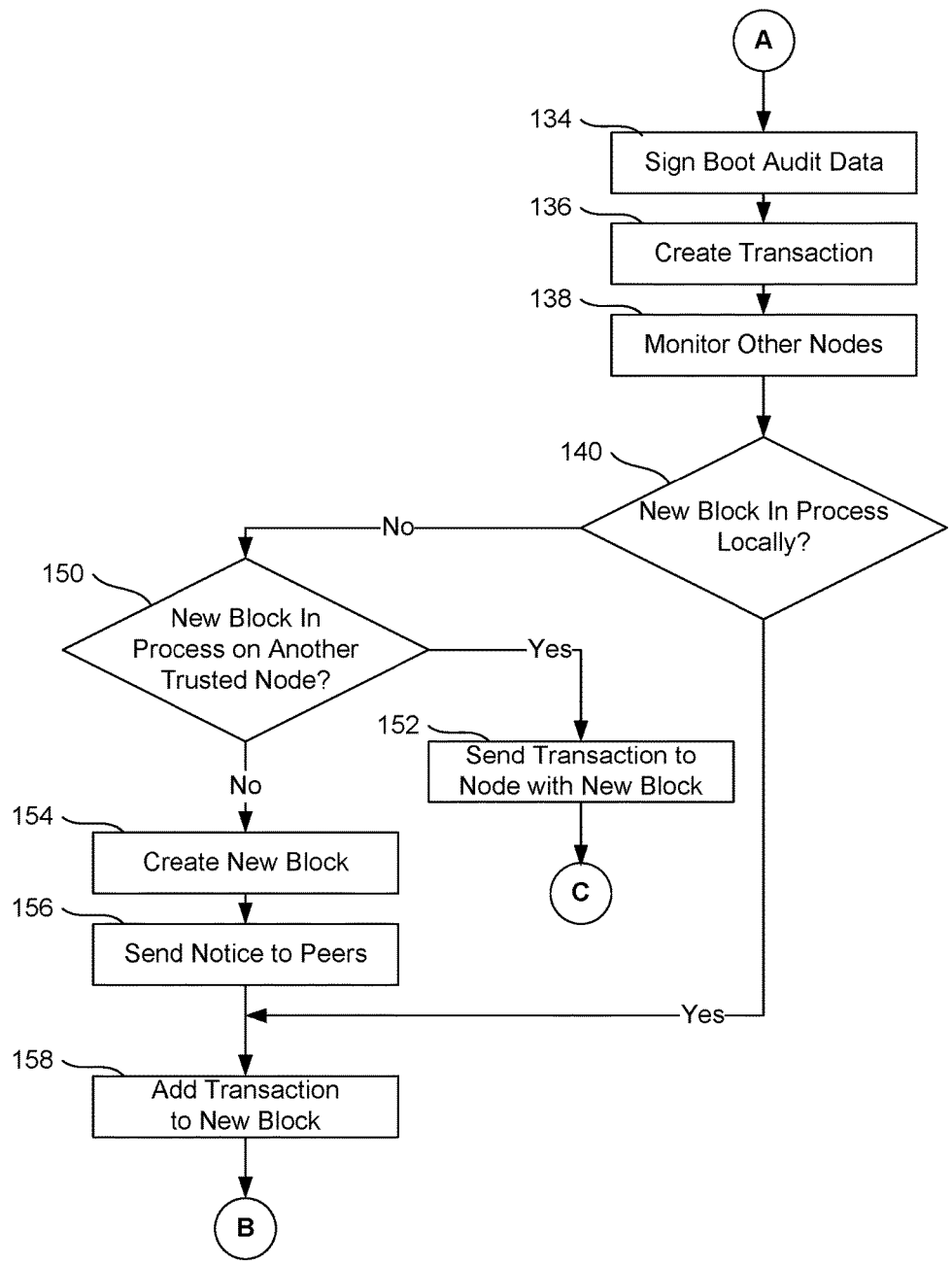
Figure 2C:
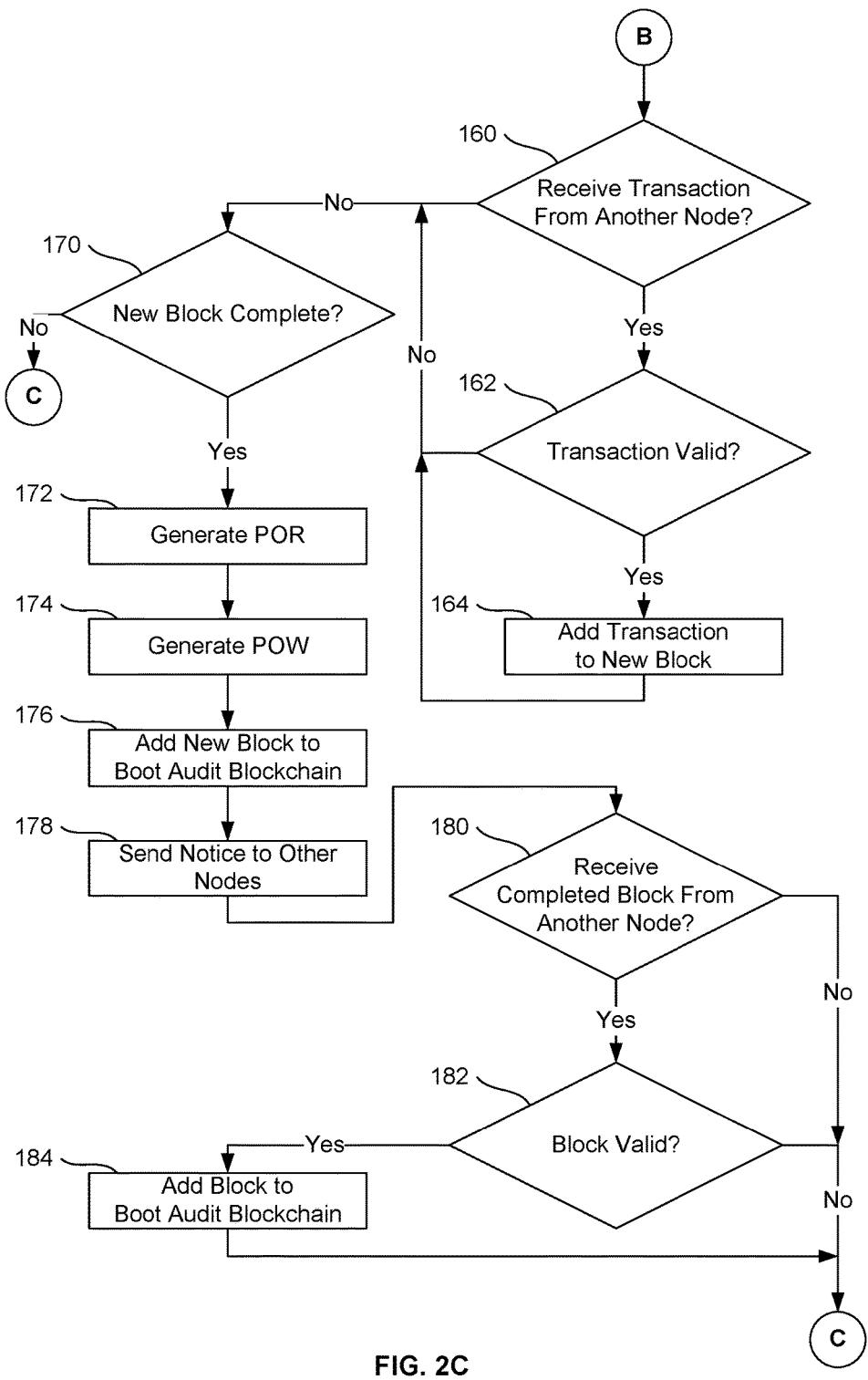

FIGS. 2A through 2C present a flowchart of a first example process for blockchain-based boot tracking, primarily from the perspective of node 20. The example process starts at block 110, in response to node 20 being powered on or reset. In response, processor 22 jumps to the reset vector, with control thereby passing to firmware 30. Firmware 30 may then use one or more firmware modules to establish a root of trust for measurement (RTM) 44 in RAM 24. The firmware module (or modules) that establishes RTM 44 may be referred to (collectively) as the RTM module.

In particular, as part of establishing RTM 44, the RTM module may establish a trusted execution environment (TEE) 50 in RAM 24, and the RTM module may load itself into TEE 50 for secure execution, as shown at block 110. The RTM module may use specialized instructions on processor 22 to create and utilize TEE 50. For instance, to create and utilize a TEE, a device may use the technology provided by Intel Corporation under the name or trademark "Intel Software Guard Extensions" or "Intel SGX," or the technology provided by ARM Ltd. under the name or trademark "ARM TrustZone." In the embodiment of FIG. 1, node 20 protects the data in TEE 50 from being accessed or modified by any software or other components outside of TEE 50, including software operating at the OS level. TEE 50 thus provides an isolated execution environment.

As shown at block 112, the RTM module may then cause itself to be measured. As shown at block 114, the RTM module may then save that measurement, or information based on that measurement, as boot audit data. For instance, RTM module may extend the measurement into PCR 42. Accordingly, the value in PCR 42 may constitute a measurement of RTM 44, and that value may be used subsequently to verify the integrity of RTM 44.

For purposes of this disclosure, data that is derived from or based on a measurement of a boot module may be referred to as a "boot measurement." As indicate below, boot audit data may include boot measurements, as well as other data pertaining to the boot process.

Once the boot measurement for RTM 44 has been saved, RTM 44 may be considered to be established.

In addition or alternatively, trust in RTM 44 may be established by a platform certificate that was issued by the platform manufacturer and that describes the RTM. For example, the RTM module could be a boot module that was stored in NVM 26 at manufacturing time, along with a certificate from the manufacturer. The certificate could state that the RTM is implemented as a boot module in NVM, and the certificate could include a reference measurement for that boot module. The manufacturer could thereby show that the RTM is reasonably immutable and is protected by a reference measurement that is signed by the manufacturer. If this is the case, when RTC 46 builds the transaction to publish the boot audit data for RTM 44 to primary blockchain 60, RTC 46 could include the certificate with the reference measurement in the transaction. The transaction may therefore provide primary blockchain 60 with enough information for a verifier to effectively evaluate the assertion of trust.

In the example embodiment, the only way to modify PCR 42 is with an extend operation. An extend operation combines the existing contents (e.g., X) of a PCR with the new data (e.g., Y) to generate an extend result (e.g., Z). For instance, the extend operation may (a) concatenate X and Y, (b) hash that combined value to generate the result Z, and (c) replace X in the PCR with Z. Consequently, if a verifier who knows (a) what the measurement of the RTM module is supposed to be, (b) what the initial value of the PCR is supposed to be (e.g., zero), and (c) which hash function (or other function) is used to generate Z, the verifier can easily determine whether the RTM module has been tampered with, based on the boot measurement in PCR 42.

For purposes of this disclosure, RTS 40 is referred to as a "root of trust" for storage because the verifier must rely on the storage in RTS 40 to always behave in the expected manner. That is, the verifier must trust that RTS 40 will reliably store data and will reliably report the stored data. Similarly, RTM 44 is referred to as a "root of trust" for measurement because the verifier must rely on RTM 44 to always behave in the expected manner. That is, the verifier must trust that RTM 44 will provide reliable measurements.

After the boot measurement for the RTM module has been saved, firmware 30 may determine whether node 20 has been configured to use a secure boot process, as shown at block 120. This determination may be made based on basic input/output system (BIOS) boot settings, for example. If node 20 has been configured to use a secure boot process, firmware 30 may then determine whether the current boot configuration measurement is a valid measurement, as shown at block 124. For instance, firmware 30 may compare the current value of PCR 42 with a "whitelist" of measurements for known good firmware configurations. The whitelist may be stored in PM 41, for instance. If the measurement is not good, firmware 30 may apply a predetermined secure boot policy, as shown at block 126. For instance, that policy may cause firmware 30 to generate an error message, to create an error log, to stop processor 22 from executing any more instructions, etc.

However, if the measurement is good, or if node 20 is not configured to use secure boot, firmware 30 may then determine whether the module that was just measured has been loaded yet, as shown at block 128. If the module that was just measured has not been loaded yet, firmware 30 may load that module, as shown at block 130. In particular, as described in greater detail below, for each "next" firmware module that is to be loaded after the RTM module has been loaded, before loading that next firmware module, firmware 30 may (a) measure the module, (b) save boot audit data based on that measurement, and (c) verify whether that measurement is good (if necessary due to secure boot), as indicated above. However, as a special case, firmware 30 may load the RTM module before measuring the RTM module, as described above.

Using the operations described above and below, firmware 30 may load a sequence of roots of trust, following by various additional firmware modules. Each root of trust may rely on or incorporate the previous root of trust. In particular, referring again to FIG. 1, firmware 30 creates RTM 44 on top of RTS 40, then firmware 30 creates a root of trust for reporting (RTR) 45 on top of RTM 44, and then firmware 30 creates a root of trust for chaining (RTC) 46 on top of RTR 45.

Referring again to FIG. 2A, once the current firmware module has been loaded and measured, firmware 30 may then determine whether RTC 46 has been established yet, as shown at block 132. If RTC 46 has not been established yet, the process may return to block 112, with firmware 30 measuring the module (or modules) needed establish RTC 46. For purposes of this disclosure, the module (or modules) needed establish RTC 46 may be referred to (collectively) as the "RTC module." As shown at block 114, firmware 30 may then save boot audit data for the RTC module. For instance, firmware 30 may extend the measurement of the RTM module into PCR 42.

However, in an alternative embodiment, the RTS may include multiple PCRs. For instance, an RTS may include twenty or more PCRs. Also, the firmware may use a different PCR each time it saves a new measurement. For instance, the firmware may extend the measurement for the RTM module to a first PCR, and the firmware may extend the measurement for the RTC module into a second PCR. In another alternative embodiment, some PCRs may only get a measurement for one module, and other PCRs may get measurements for more than one module. Accordingly, if multiple modules constitute what this disclosure refers to in general as the RTM module, all of those modules may get extended, in succession, into one PCR. Likewise, if multiple modules constitute what this disclosure refers to in general as the RTC module, all of those modules may get extended, in succession, into one PCR. And the PCR for the RTM module may be the same as the PCR for the RTC module, or it may be different.

Referring again to FIG. 2A, after saving the boot measurement for the RTC module, firmware 30 may follow the process described above and eventually arrive at block 130. Firmware 30 may then load the RTC module into TEE 50. RTC 46 may then be considered to have been established. Also, as indicated above, as the various roots of trust are established, each may incorporate the functionality from the earlier roots of trust. Consequently, RTS 40 may be considered part of RTM 44, RTM 44 may be considered part of RTR 45, and RTR 45 may be considered part of RTC 46.

Referring again to block 132, once RTC 46 has been established, the process may pass through page connecter A to FIG. 2B. As shown at block 134, RTR 45 may then sign the current boot measurement. That boot measurement may come from PCR 42. In other words, firmware 30 may generate a signed report of the current value of PCR 42. Or, in an alternative embodiment with multiple PCRs, the RTM may measure and the RTR may sign the boot measurement for the RTM from one PCR, the RTM may measure and the RTR may sign the boot measurement for the RTR from another PCR, and the RTM may measure and the RTR may sign the boot measurement for the RTC from a third PCR. And when other firmware modules are processed in other iterations of the illustrated flow, the boot measurement that is signed in block 134 may be the PCR value for the firmware module that was last measured and loaded, as described above.

To sign the current boot measurement, RTR 45 may "quote" PCR 42. In one embodiment, RTR 45 uses an attestation key to sign the boot measurement. That attestation key may come from RTS 40, for instance. And when RTC 46 subsequently creates a transaction for the boot measurement, RTC 46 includes a timestamp in that transaction. In particular, RTC 46 may rely upon RTS 40 to obtain a secure time for that timestamp value. Consequently, it will be possible to determine the sequence of measurements added to primary blockchain 60 for a specific platform. And there may be multiple platforms writing to primary blockchain 60, but each platform may use a different signing key to sign its transactions. So the sequence of reported measurements per platform is unambiguous.

As shown at block 136, after RTR 45 signs the boot measurement, RTC 46 may then create a transaction for primary blockchain 60. That transaction may include the signed boot measurement as part of the payload. The payload may also include a boot stage identifier to indicate what part of the boot process or which firmware module is reflected in the boot measurement. In addition, RTC 46 may sign the transaction. RTC 46 may include that digital signature as part of the header for the transaction, for example. RTC 46 may use a mining key, for instance, to sign the transaction. The mining key may be a key protected by RTS 40. Signing operations may be performed by RTR 45 where the signed transaction is returned to RTC 46 for further processing, and where the permission to use the mining key may be established conditionally on the contents of PCR 42, where a key-use policy contains a measurement that must match the measurement contained in PCR 42.

However, if RTR 45 has just signed two (or more) different boot measurements (e.g., one for the RTM module and one for the RTC module), RTC 46 may create two (or more) transactions.

In one embodiment, each transaction includes a signed copy of the boot measurement. A signed copy of the boot measurement may include (a) a plaintext copy of the boot measurement and (b) a digital signature from RTR 45. The digital signature may include, without limitation, items such as the following:
- a source identifier to identify the source of the boot measurement;
- a boot stage identifier to indicate which boot stage or firmware module is reflected in the boot measurement;
- an integrity value, such as a hash of the boot measurement;
- plaintext data pertaining to the boot measurement (e.g., actual image files loaded as part of boot);
- ciphertext that was generated by using a private key; and
- the public key that corresponds to the private key that was used to generate the ciphertext.

The ciphertext may be based on the plaintext in the header or other plaintext. That plaintext may include items such as a binary code image file that was actually loaded, settings that were applied as part of loading or executing a module, interpreted code that was part of "loading" the boot module, or any other file or data item informing the boot process or specifying a policy to be applied at boot time. To identify the source of the boot measurement, the source identifier may actually identify boot images, software update packages, patches or configuration data applied during the boot process, etc. For instance, the source identifier may be a software bundle identifier, a software update package identifier, a version number, a revision number, a patch number, a software update service address, another reference to a loadable module repository, etc.

As described in greater detail below, a verifier may use the public key to decrypt the ciphertext in the signature, the verifier may compare the decrypted result with the plaintext in the signature, and the verifier may check with a third party to verify that public key belongs to the source. In one embodiment, the digital signature includes a digital certificate that contains some or all of the items described above, along with other items such as a digital certificate serial number, etc.

For purposes of this disclosure, a transaction may be referred to as an "internal transaction" when that transaction is being stored or processed by the node that created it, and a transaction may be referred to as an "external transaction" when that transaction is being stored or processed by a node other than the node that created it. In FIG. 1, internal transaction 52 represents a transaction that was generated by node 20, and external transaction 56 represents a transaction that was generated by node 70. To reflect the source was external, external transaction 56 is depicted with dotted fill in node 20, and internal transaction 52 is depicted with dotted fill in node 70.

RTC 46 may create internal transaction 52 at block 136. As shown at block 138, RTC 46 may then monitor other nodes, with regard to operations affecting primary blockchain 60. For instance, RTC 46 may receive notices from node 70 (or other nodes) indicating (a) that node 70 has started building a new block for primary blockchain 60 or (b) that node 70 has finished building a new block for primary blockchain 60. As indicated below with regard to block 160, RTC 46 may also receive transactions from other nodes.

As shown at block 140, RTC 46 may then determine whether a new block is already in process on node 20. If RTC 46 is not already working on a new block, RTC 46 may determine whether a new block is in process on another node, and if so, whether that node should be trusted, as shown at block 150. As described in greater detail below with regard to block 162, RTC 46 may receive transactions from other nodes. RTC 46 may determine which other nodes are trustworthy based on those transactions. For instance, RTC 46 may determine that a new block is in process on node 70, and RTC 46 may determine that node 70 can be trusted based on received transactions that are determined to be valid and that indicate that node 70 has a trustworthy RTS, a trustworthy RTM, and a trustworthy RTC.

As shown at block 152, if a new block is already in process on another trusted node, RTC 46 may send the current transaction (or transactions) to that other node, for inclusion in that block. The process may then return to FIG. 2A. As shown at block 190, firmware 30 may then determine whether there are more modules to measure and load. If so, the process may return to block 112, with firmware 30 measuring modules, saving boot audit data, etc., as described above. However, if there are no more modules to measure, the process may pass through page connector B to FIG. 2C.

Referring again to block 150, if a trusted node is not already working on a new block, the process may flow to blocks 154 and 156, with RTC 46 creating a new block for primary blockchain 60 and sending a notice to the other nodes that node 20 is now filling a new block with transactions. As shown at block 158, RTC 46 may then add the current transaction (or transactions) to that new block. The process may then pass through page connector B to FIG. 2C.

RTC 46 may then determine whether node 20 has received a transaction from another node, as shown at block 160. Referring again to FIG. 1, a transaction from another node is illustrated as external transaction 56. If an external transaction has been received, RTC 46 may determine whether that transaction is valid, as shown at block 162. For instance, RTC 46 may determine whether the transaction (e.g., external transaction 56) has a valid digital signature. Additionally, RTC 46 may determine whether the boot measurement in the transaction reflects a valid configuration. For instance, RTC 46 may determine whether the boot measurement matches a boot measurement for the corresponding boot stage of node 20. For instance, if the boot measurement is for the RTM module in node 70, node 20 may determine whether that boot measurement matches the measurement for the RTM module in node 20. In addition or alternatively, RTC 46 may consult a whitelist and a blacklist to determine whether the boot measurement reflects a valid configuration. The whitelist may allow nodes with dissimilar but compatible RTCs to establish a common link without mandating identical RTCs. The common link may be useful if a node implements multiple blockchains (e.g., BC1 and BC2), and the node wants to pass some BC1 transactions to BC2. BC1 may be a private blockchain system 10, and BC2 may be a public blockchain, for example. Accordingly, a single node might have multiple RTCs for different blockchains.

If the transaction is valid, RTC 46 may add the transaction to the new block, as shown at block 164. If the transaction is not valid, RTC 46 may discard the transaction. Alternatively, RTC 46 may add invalid transactions to a different blockchain, or RTC 46 may add invalid transactions to primary blockchain 60, but with a flag to mark those transactions as invalid. In addition, RTC 46 may keep track of which other nodes have booted to a valid RTC, and RTC 46 may discard subsequent transactions from any node with an invalid RTC.

Referring again to the embodiment of FIG. 2C, after adding the transaction, or determining that the transaction is not valid and discarding it, RTC 46 may determine whether the new block should be considered complete, as shown at block 170. That determination may be made based on one or more predetermined parameters specifying the conditions which should cause a new block to be completed. Those parameters may specify one or more conditions to be met, including (a) expiration of a deadline for block completion, (b) a predetermined limit on the number of transactions to be included in a block, and (c) any other suitable conditions. The deadline for block completion may specify a predetermined limit on the amount of time since the block was created, for instance. If the new block should not be considered complete yet, the process may pass through page connector C to block 190, with processing to continue as described above.

If the new block should be considered complete, RTC 46 may generate a proof of reliability (POR) for the block, as shown at block 172. The POR may be a hash of the payload of the block. As shown at block 174, RTC 46 may also generate a proof of work (POW) for the block. The POW may be a value which tends to indicate that a certain amount of processing resources (e.g., time) was used to create the block, to prevent or deter a rogue node from hijacking primary blockchain 60. The amount of time needed (on average) to create a POW may vary depending on the needs in a particular implementation. And if an implementation is best suited by no additional delay, the POW may be omitted and not required.

As shown at block 176, after adding the POR and the POW to the new block, RTC 46 may then add the new block to primary blockchain 60. As shown at block 178, RTC 46 may then send a notice to the other nodes that it has completed the new block that it was building. That notice may include the new block, a predetermined number of the most recent blocks from primary blockchain 60, or the entire primary blockchain 60.

As shown at block 180, RTC 46 may then determine whether node 20 has received a newly completed block from another node (e.g., node 70). If a newly completed node has been received, RTC 46 may validated that block, as shown at block 182. Block validation may include determining whether the block's POR is valid and whether all of the transactions in the payload are valid. And transaction validation may include determining whether the measurement in the transaction reflects a valid or approved configuration. For instance, RTC 46 may determine whether the measurement in the transaction matches a corresponding measurement for the configuration of node 20. In addition or alternatively, RTC 46 may determine whether the measurement can be found on a whitelist of approved configurations or a blacklist of invalid configurations. If RTC 46 determines that the transactions and the other parts of the block are valid, RTC 46 may add the newly completed block to primary blockchain 60, as shown at block 184. However, if RTC 46 determines that any of the transactions are invalid or that the block is invalid for any other reason, RTC 46 may discard the newly completed block. The process may then flow to block 190 in FIG. 2A via page connecter C.

As indicated above, firmware 30 may then determine whether there are more modules to measure, etc. Thus, nodes 20 and 70 may cooperate using a process with operations like those described above to implement blockchain-based boot tracking.

According to the process described above, a node may generate a new measurement, new boot audit data, and a new transaction for each firmware module that is loaded on the node. Alternatively, after measuring all of the firmware modules, a node may generate a single transaction to represent all of those firmware modules. Alternatively, a node may generate multiple transactions, and each of those transactions may represent one or more firmware modules. Accordingly, alternative embodiments may use a process that is similar to the process illustrated in FIGS. 2A through 2C. However, blocks 128 and 130 may both lead to block 190 instead of block 132. And when the node determines at block 190 that there are no more modules to measure, the process may proceed to block 132.

Thus, according to one operational flow, each transaction contains an individual PCR measurement for one boot stage. And according to another operational flow, a transaction may contain a summary of more than one boot state, or a summary of all boot states.

For instance, the firmware in a node with a TPM may be designed to execute the following sequence of steps:
measure the RTM module into PCR0 in the TPM;
the RTM then measures the RTC module into PCR1;
the RTM measures two (or more) modules into PCR2; and
the RTM measure several more modules into PCR3.

Additionally, this process may continue until the RTM has measured modules into twenty (or more) different PCRs in the TPM. And if the node is an analysis system, one of the steps may involve measuring an RTA module into one of the PCRs (e.g., PCR10). The firmware may also be designed to report one or more PCRs to the blockchain in response to finishing with a PCR. In other words, whenever a boot step transitions to an old PCR to a new one, the firmware may report the old PCR to the blockchain. Alternatively, the firmware may write multiple PCRs to the blockchain in response to finishing with one of those PCRs. For instance, the firmware may write PCR0 and PCR1 to the blockchain in response to finishing with PCR1. In other words, the firmware may wait until the RTC 46 has been established before writing both the RTM measurement and the RTC measurement to the blockchain. The other nodes may then verify those RTM and RTC measurements. And upon completion of the boot process, the blockchain may contain a full set of PCR measurements, and those measurements may be verifiable by all other nodes.

When node 70 (or any other peer node) boots, it may also perform the operations described above. Consequently, in one embodiment, after node 20 and node 70 have finished booting, they will have cooperated to produce a ledger that contains PCR measurements from multiple nodes and multiple stages for each node. Accordingly, when a node that includes an RTA has booted, the blockchain will include the measurement for that RTA.

As described in greater detail below with regard to FIG. 3, the node (or nodes) with the RTA (e.g., analysis system 80) may then use the RTA to derive useful information from primary blockchain 60. For instance, based on primary blockchain 60, analysis system 80 may record blockchain transactions which log everything that was extended into PCRs during boot, to be saved indefinitely. The RTA may record those blockchain transactions into a secondary blockchain, as indicated below. In addition or alternatively, the RTA may record those transactions into the primary blockchain.

As indicated above, RTC 46 may be loaded locally as part of the system boot. And there may be a period between the time that RTC 46 is loaded and the time that the measurement of RTC 46 is contributed to primary blockchain 60. Therefore, it may be said that RTC 46 is established before the transaction with the measurement of RTC 46 is committed to primary blockchain 60 and accepted by the peer nodes. Nevertheless, the RTC measurement is protected from local modification using RTS 40.

Also, a compromised or rogue node with an invalid RTC (or any other invalid module) might share the measurement of the invalid RTC, or the rogue node might withhold that measurement, for fear that the measurement would be discovered to be fake. Consequently, verifiers (e.g., the other nodes) may treat the failure to disclose a measurement basically the same way they would treat detection of an invalid measurement.

Consequently, as long as most of the nodes have not been compromised, the uncompromised nodes should be able to keep blocks from rogue nodes from being incorporated in primary blockchain 60. And once a consensus or majority of the nodes agree that the RTC measurement (for example) for a particular node is valid or legitimate, then it can be said that a "distributed RTC" has been established. In addition, once a set of nodes the nodes has cooperated to establishing a distributed RTC, the nodes may themselves be referred to (collectively) as a "distributed RTC."

Figure 3:
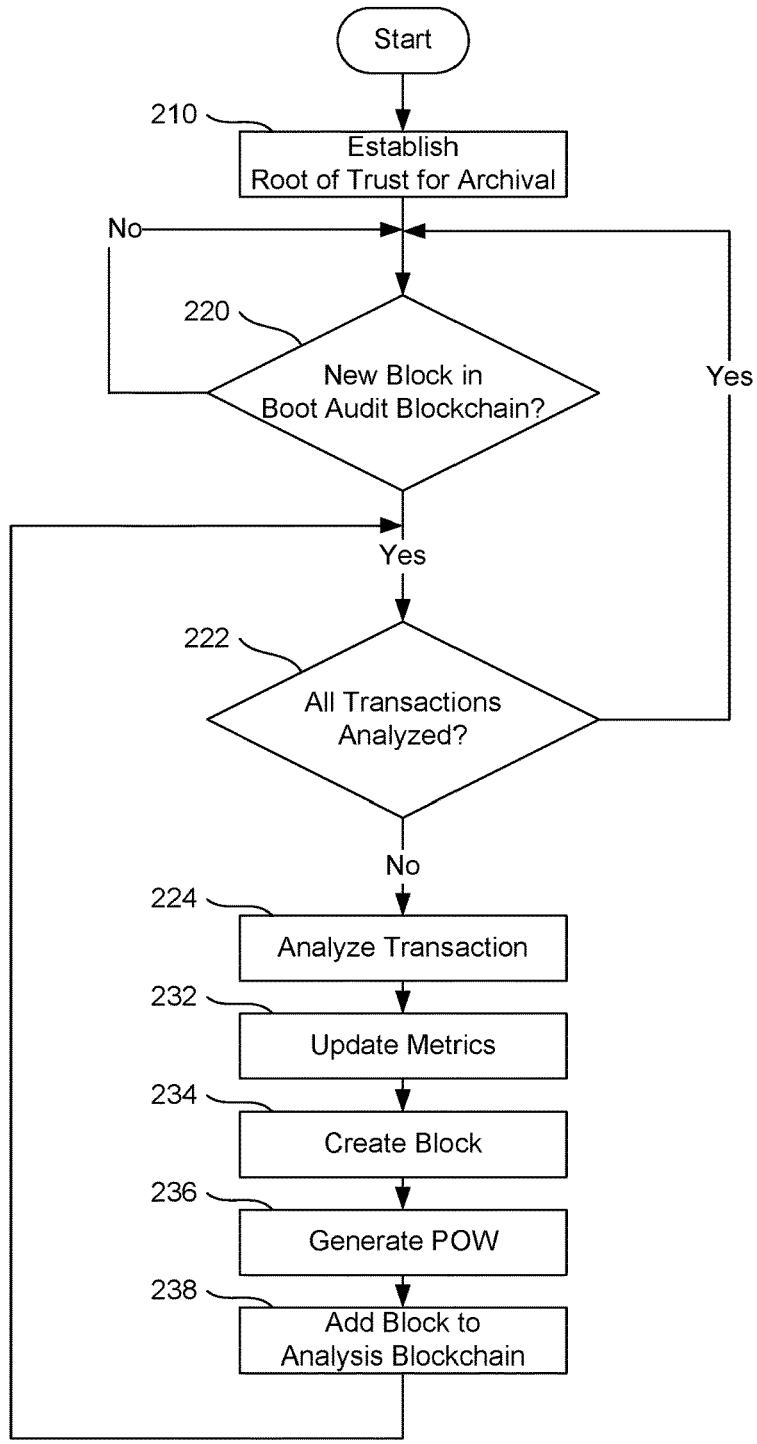
FIG. 3 is a flowchart of an example process involving primary and secondary blockchains.

FIG. 3 is a flowchart of an example process involving primary blockchain 60 and secondary blockchain 82. As described in greater detail below, that process may be performed by analysis system 80. In particular, analysis system 80 may use the illustrated process to generate useful data, based on analysis of information from primary blockchain 60, and to archive the generated data in secondary blockchain 82 for future reference by analysis system 80 or by other systems. Accordingly, as indicated above, secondary blockchain 82 may also be referred to as analysis blockchain 82. Also, node 20 and node 70 may treat analysis system 80 as another node. Consequently, whenever a new block is added to primary blockchain 60, analysis system 80 may receive a copy of that block.

The process of FIG. 3 may start with analysis system 80 establishing a root of trust for archival (RTA 84), as shown at block 210. The root of trust for archival may also be referred to as root of trust for analysis. To establish RTA 84, analysis system 80 may use an RTS and a TEE to create an RTM, an RTR, and an RTC, as described above with regard to node 20. Analysis system 80 may then launch one or more analysis modules in that TEE to establish RTA 84. That analysis module(s) may then perform the operations described below.

In particular, as shown at block 220, analysis system 80 may then wait until a new block gets added to primary blockchain 60. Whenever a new block is added, analysis system 80 may analyze the transactions in that block as indicate below. For instance, if analysis system 80 determines at block 220 that there is still at least one transaction that has not been analyzed yet, analysis system 80 may analyze the next transaction, as shown at block 224. For example, analysis system 80 may analyze the boot audit data in the transaction and classify that boot audit data into a certain category. Those categories may include, for instance, good configurations, bad configurations, known-but-unclassified configurations, and questionable configurations. Analysis system 80 may determine which category should be used based on a whitelist for good configurations, a blacklist for bad configurations, and a gray list for suspect configurations, for instance.

As shown at block 232, analysis system 80 may then update a record containing boot metrics pertaining to the analyzed transactions. Those boot metrics may indicate how many boot configurations of each category have been detected. Analysis system 80 may also analyze additional aspects of the boot audit data and include results from that additional analysis in the boot metrics. As indicate below, analysis system 80 may then save the boot metrics in secondary blockchain 82. For instance, analysis system 80 may use secondary blockchain 82 to archive some or all of the boot audit data for one, some or all of the nodes. That boot audit data could be voluminous, especially for platforms that reboot frequently. The archived boot audit data may subsequently be used to settle disputes relating to PCR values that were saved to primary blockchain 60. Secondary blockchain 82 may be configured and tuned for storage and archival of large data sets and transactions, while primary blockchain 60 may be configured and tuned for fast response and low latency. For example, primary blockchain 60 may be used to record only PCR values or other summaries of boot modules, boot settings, and boot event, without saving actual boot images and such.

Also, an audit analyst (e.g., a SAS 70 compliance officer) may inspect boot audit data on secondary blockchain 82 to find evidence of SAS 70 compliance and then verify the integrity of the data using transactions found on primary blockchain 60. In addition or alternatively, analysis system 80 may automatically perform real time analysis of primary blockchain 60 to verify validity and integrity of the configuration of the measured nodes before committing boot metrics to security coprocessor 22.

As shown at block 234, after analyzing boot audit data from primary blockchain 60 and generating a record of boot metrics, analysis system 80 may then create a new block that includes the record with those boot metrics. As shown at block 236, analysis system 80 may then generate a POW for the new block. As shown at block 238, analysis system 80 may then add the new block to secondary blockchain 82. The process may then return to block 222, with analysis system 80 determining whether there are any more transactions to analyze. And once all of the transactions have been analyzed, the process may return to block 220, with analysis system 80 waiting for the next new block in primary blockchain 60.

In addition, RTA 84 may periodically include some or all of primary blockchain 60 as a block or transaction in secondary blockchain 82, to establish a sync point between the two blockchains. Such a block or transaction may be referred to in general as a "sync block." Consequently, if primary blockchain 60 is subsequently overcome by one or more attackers, the sync blocks in secondary blockchain 82 may serve as public evidence that is protected from the attackers of primary blockchain 60.

In one embodiment, primary blockchain 60 is protected (e.g., via encryption) to prevent unauthorized devices from accessing the data in primary blockchain 60.

In one embodiment, a DCS includes devices which use a hierarchy of blockchains, to prevent transaction latency from adversely affecting boot performance for the devices that need to boot more quickly. For instance, a DCS configured as part of the Internet-of-things (IOT) may use include (a) a first group of sensors or actuators that can tolerate delays attributable to audit processing of no more than 10 milliseconds or 100 milliseconds, and (b) a second group of devices that can tolerate more lengthy delays attributable to audit processing. Accordingly, the first group may use a primary blockchain with no POW and with a very short deadline for block completion, while the second group may use a secondary blockchain with a POW that is relatively easy to calculate and a longer deadline for block completion. That primary blockchain may be referred to as a "parent blockchain," that secondary blockchain may be referred to as a "child blockchain," etc. And there may be multiple layers of nesting in a hierarchical approach. For example, a lighting array could have no POW for a primary blockchain; a secondary blockchain may have a POW measured in seconds, and a tertiary blockchain could have a POW measured in minutes. And each higher-level blockchain may use sync blocks to archive information from the blockchain below. Accordingly, attacks on the bottom tier might be effective only during the last second(s) after the sync block was posted to the secondary blockchain, and attacks to the secondary blockchain might be effective only during the last minute(s) after the sync block to the tertiary blockchain.

As has been described, this disclosure presents a technical protocol for operating a blockchain, and that protocol enables nodes to cooperate in maintaining a blockchain to log configuration data for the nodes. Nodes may also analyze the blockchain and update the blockchain (or a separate blockchain) with information about valid configurations, invalid configurations, etc. The present teachings may be used in a wide variety of implementations. For instance, the present teachings may be used in a data center housing numerous interconnected servers and other nodes. Such a data center may be subject to certain security and integrity requirements, such as SAS 70, and the nodes may use the present teaching to satisfy those requirements. Similarly, the present teachings may be used by a large organization that has one or more enterprise operations centers (EOCs), where those EOCs are subject to security and integrity requirements affecting workstations, department servers, file servers, network function virtualization servers, user endpoint devices, and other device. Likewise, as indicated above, the present teachings may be used in implementation involving the IOT, where at least some of the IOT devices need to demonstrate integrity policy compliance.

In at least one embodiment, nodes measure boot integrity and use distributed ledger technology to ensure that measurement data is reliably recorded to a persistent ledger that is very difficult for isolated attackers to damage or hijack. The present teaching may thus be used to create an immutable, distributed log, to ensure that all actions affecting the configuration of a node can be audited. When used with nodes that utilize trusted boot, the present teachings may be referred to in general as trusted boot verification with blockchain (TBVB), and associated components may be referred to as "TBVB components." Thus, TBVB nodes may use a distributed ledger to persistently capture boot events.

As described above, peer RTCs may cooperate to ensure each other's measurements are committed to the ledger, and that the ledger is distributed with high redundancy. Also, since some nodes may lack sufficient storage to keep all of the logged information, one or more nodes with sufficient storage may serve as RTAs to persistently archive all of the information, either in the form of a complete primary blockchain, or in the form of a secondary blockchain with copies of the transactions from the primary blockchain. Multiple RTAs may be used, to provide for cooperative validation of blocks and for redundant copies of the secondary blockchain.

In one embodiment, one or more RTA nodes may use cloud storage. And as described above, RTA nodes may also participate as RTCs.

A forensic analyst may generate reference measurements or reference profiles, based on blocks from a secondary blockchain for a DCS. A reference profile may include one or more attributes from the boot audit data, along with a classification identifier to indicate whether those attributes reflect a good configuration, a bad configuration, a questionable or suspect configuration, or an unclassified configuration. The analyst may then add those reference profiles to whitelists or blacklists. The updated whitelists and blacklists may then be sent to the nodes of that DCS (or to a different DCS), to be used for determining whether boot audit data reflect valid or invalid configurations.

The forensic analyst may also use integrity log information from the primary blockchain, the secondary blockchain, or both blockchains to build attack models and chain of custody reports. The analyst may also identify particular nodes as being out of compliance, and the analyst can report those nodes as needing repair. The present teaching may therefore facilitate proactive manageability of a wide range of devices and platforms.

The present teachings may enable organizations to complete SAS Service Organization Controls (SOC) Compliance Audits with dynamic reports from a public ledger, instead of waiting weeks or months for a data center to publish a report. The present teachings may also enable a management system in a data center management to update or roll back firmware in a collection of nodes, to provide security or functionality patches, with transactions being captured in public ledger for future inspection.

In light of the principles and example embodiments described and illustrated herein, it will be recognized that the illustrated embodiments can be modified in arrangement and detail without departing from such principles. Also, even though expressions such as "an embodiment," "one embodiment," "another embodiment," or the like are used herein, these phrases are meant to generally reference embodiment possibilities, and are not intended to limit the invention to particular embodiment configurations. As used herein, these phrases may reference the same embodiment or different embodiments, and those embodiments are combinable into other embodiments.

This disclosure may refer to instructions, functions, procedures, data structures, application programs, microcode, configuration settings, and other kinds of data. As described above, when the data is accessed by a machine or device, the machine or device may respond by performing tasks, defining abstract data types or low-level hardware contexts, and/or performing other operations. For instance, data storage, RAM, and/or flash memory may include various sets of instructions which, when executed, perform various operations. Such sets of instructions may be referred to in general as software. And software that is used during the boot process may be referred to as firmware. Software that is stored in non-volatile storage may also be referred to as firmware. In addition, terms like "program" and "module" may be used in general to cover a broad range of software constructs, including applications, routines, drivers, subprograms, processes, and other types of software components. Any suitable operating environment and programming language (or combination of operating environments and programming languages) may be used to implement software components described herein.

Alternative embodiments include machine accessible media encoding instructions or control logic for performing the operations described herein. Such embodiments may also be referred to as program products. Such machine accessible media may include, without limitation, tangible storage media such as magnetic disks, optical disks, RAM, read-only memory (ROM), etc., as well as processors, controllers, and other components that include RAM, ROM, and/or other storage facilities. For purposes of this disclosure, the term "ROM" may be used in general to refer to non-volatile memory devices such as erasable programmable ROM (EPROM), electrically erasable programmable ROM (EEPROM), flash ROM, flash memory, etc.

It should also be understood that the hardware and software components depicted herein represent functional elements that are reasonably self-contained so that each can be designed, constructed, or updated substantially independently of the others. In alternative embodiments, many of the components may be implemented as hardware, software, or combinations of hardware and software for providing the functionality described and illustrated herein. In some embodiments, some or all of the control logic for implementing the described operations may be implemented in hardware logic (e.g., as part of an integrated circuit chip, a programmable gate array (PGA), an application-specific integrated circuit (ASIC), etc.).

In at least one embodiment, the instructions for all relevant components may be stored in one non-transitory machine accessible medium. In at least one other embodiment, two or more non-transitory machine accessible media may be used for storing the instructions for the relevant components. For instance, instructions for one component may be stored in one medium, and instructions another component may be stored in another medium. Alternatively, a portion of the instructions for one component may be stored in one medium, and the rest of the instructions for that component (as well instructions for other components), may be stored in one or more other media. Instructions may also be used in a distributed environment, and may be stored locally and/or remotely for access by single or multi-processor machines. Similarly, applications and/or other data that are described above as residing on a particular device in one example embodiment may, in other embodiments, reside on one or more other devices. And computing operations that are described above as being performed on one particular device in one example embodiment may, in other embodiments, be executed by one or more other devices.

The present teachings may be used to advantage in many different kinds of data processing systems. Example data processing systems may include, without limitation, systems on a chip (SOCs), wearable devices, handheld devices, smartphones, telephones, entertainment devices such as audio devices, video devices, audio/video devices (e.g., televisions and set top boxes), vehicular processing systems, personal digital assistants (PDAs), tablet computers, laptop computers, portable computers, personal computers (PCs), workstations, servers, client-server systems, distributed computing systems, supercomputers, high-performance computing systems, computing clusters, mainframe computers, mini-computers, and other devices for processing or transmitting information. Accordingly, unless explicitly specified otherwise or required by the context, references to any particular type of data processing system (e.g., a PC) should be understood as encompassing other types of data processing systems, as well. Also, unless expressly specified otherwise, components that are described as being coupled to each other, in communication with each other, responsive to each other, or the like need not be in continuous communication with each other and need not be directly coupled to each other. Likewise, when one component is described as receiving data from or sending data to another component, that data may be sent or received through one or more intermediate components, unless expressly specified otherwise. In addition, some components of the data processing system may be implemented as adapter cards with interfaces (e.g., a connector) for communicating with a bus. Alternatively, devices or components may be implemented as embedded controllers, using components such as programmable or non-programmable logic devices or arrays, ASICs, embedded computers, smart cards, and the like. For purposes of this disclosure, the term "bus" includes pathways that may be shared by more than two devices, as well as point-to-point pathways. Also, for purpose of this disclosure, a processor may also be referred to as a processing unit, a processing element, a central processing unit (CPU), etc.

Also, although one or more example processes have been described with regard to particular operations performed in a particular sequence, numerous modifications could be applied to those processes to derive numerous alternative embodiments of the present invention. For example, alternative embodiments may include processes that use fewer than all of the disclosed operations, process that use additional operations, and processes in which the individual operations disclosed herein are combined, subdivided, rearranged, or otherwise altered.

In view of the wide variety of useful permutations that may be readily derived from the example embodiments described herein, this detailed description is intended to be illustrative only, and should not be taken as limiting the scope of coverage.

The following examples pertain to further embodiments.

Example A1 is a device with support for blockchain-based boot tracking. The device comprises at least one processor, non-volatile storage responsive to the processor, and instructions in the non-volatile storage. The instructions, when executed by the processor, enable the device to (a) automatically generate a measurement of a boot module of the device, (b) automatically generate an internal ledger transaction based on the measurement of the boot module, and (c) automatically send the internal ledger transaction to a remote device. The instructions also enable the device to (a) receive an external ledger transaction from the remote device, wherein the external ledger transaction is based on a measurement for a boot module of the remote device; (b) in response to receiving the external ledger transaction from the remote device, verify the external ledger transaction; and (c) in response to verifying the external ledger transaction, add the external ledger transaction to a boot audit blockchain.

Example A2 is a distributed computing system with support for blockchain-based boot tracking. The distributed computing system comprises first and second devices, wherein the first device comprises the device of Example A1, and the second device comprises the remote device of Example A1. Also, the second device comprises instructions which, when executed by the second device, enable the second device to (a) generate the external ledger transaction during boot of the second device and (b) send the external ledger transaction to the first device during boot of the second device. When executed by the second device, the instructions also enable the second device to (a) receive the internal ledger transaction from the first device; (b) in response to receiving the internal ledger transaction from the first device, verify the internal ledger transaction; and (c) in response to verifying the internal ledger transaction, add the internal ledger transaction to the boot audit blockchain.

Example A3 is a distributed computing system according to Example A2, further comprising an analyzing device with instructions which, when executed by the analyzing device, enable the analyzing device to (a) perform an analysis of ledger transactions in the boot audit blockchain; (b) generate boot metrics, based on the analysis of ledger transactions; and (c) add the boot metrics to a boot analysis blockchain.

Example A4 is a distributed computing system according to Example A3, the instructions in the analyzing device, when executed, instantiate a root of trust for archival (RTA), and the RTA enables the analyzing device to perform the operations of (a) analyzing ledger transactions in the boot audit blockchain, (b) generating the boot metrics, and (c) adding the boot metrics to the boot analysis blockchain.

Example A5 is a device according to Example A1, wherein the instructions, when executed, further enable the device to, after adding the external ledger transaction to the boot audit blockchain, send the boot audit blockchain to the remote device. Example A5 may also include the features of any one or more of Examples A2 through A4.

Example A6 is a device according to Example A5, wherein the instructions, when executed, further enable the device to, after sending the internal ledger transaction to the remote device, receive an updated version of the boot audit blockchain from the remote device, wherein the updated version of the boot audit blockchain includes the internal ledger transaction.

Example A7 is a device according to Example A1, wherein the boot audit blockchain reflects a historical order of boot module measurements for at least one device. Example A7 may also include the features of any one or more of Examples A2 through A6.

Example A8 is a device according to Example A1, further comprising a root of trust for storage (RTS) responsive to the processor, and at least one platform configuration register (PCR) in the RTS. The instructions, when executed, enable the device to update the PCR, based on the measurement of the boot module. Example A8 may also include the features of any one or more of Examples A2 through A7.

Example A9 is a device according to Example A1, wherein the instructions, when executed, enable the device to (a) instantiate a root of trust for measurement (RTM) and a root of trust for chaining (RTC) and to (b) use the RTM to generate the measurement of the boot module. Also, the instructions, when executed, enable the device to use the RTC to perform the operations of (a) generating the internal ledger transaction based on the measurement of the boot module, (b) sending the internal ledger transaction to the remote device, (c) receiving the external ledger transaction from the remote device, (d) verifying the external ledger transaction, and (e) adding the external ledger transaction to the boot audit blockchain. Example A9 may also include the features of any one or more of Examples A2 through A8.

Example A10 is a device according to Example A9, wherein the instructions, when executed, enable the device to (a) generate a trusted execution environment (TEE) in the device and (b) instantiate the RTM and the RTC in the TEE.

Example A11 is a device according to Example A1, wherein the instructions comprise (a) a root of trust for measurement (RTM) module and (b) a root of trust for chaining (RTC) module. Example A11 may also include the features of any one or more of Examples A2 through A10.

Example B1 is an apparatus to support blockchain-based boot tracking. The apparatus comprises at least one non-transitory machine-accessible storage medium and instructions in the machine-accessible storage medium. The instructions, when executed by a device, enable the device to (a) automatically generate a measurement of a boot module of the device during boot of the device; (b) automatically generate, during boot of the device, an internal ledger transaction based on the measurement of the boot module; and (c) automatically send the internal ledger transaction to a remote device during boot of the device. The instruction, when executed, also enable the device to (a) receive an external ledger transaction from the remote device, wherein the external ledger transaction is based on a measurement for a boot module of the remote device; (b) in response to receiving the external ledger transaction from the remote device, verify the external ledger transaction; and (c) in response to verifying the external ledger transaction, add the external ledger transaction to a boot audit blockchain.

Example B2 is an apparatus according to Example B1, wherein the instructions, when executed, further enable the device to, after adding the external ledger transaction to the boot audit blockchain, send the boot audit blockchain to the remote device.

Example B3 is an apparatus according to Example B2, wherein the instructions, when executed, further enable the device to, after sending the internal ledger transaction to the remote device, receive an updated version of the boot audit blockchain from the remote device, wherein the updated version of the boot audit blockchain includes the internal ledger transaction.

Example B4 is an apparatus according to Example B1, wherein the boot audit blockchain reflects a historical order of boot module measurements for at least one device. Example B4 may also include the features of any one or more of Examples B2 through B3.

Example B5 is an apparatus according to Example B1, wherein the instructions, when executed, enable the device to update a platform configuration register (PCR) in a root of trust for storage (RTS) in the device, based on the measurement of the boot module. Example B5 may also include the features of any one or more of Examples B2 through B4. Example B6 is an apparatus according to Example B1, wherein the instructions, when executed, enable the device to (a) instantiate a root of trust for measurement (RTM) and a root of trust for chaining (RTC) and (b) use the RTM to generate the measurement of the boot module. The instructions, when executed, also enable the device to use the RTC to perform the operations of (a) generating the internal ledger transaction based on the measurement of the boot module, (b) sending the internal ledger transaction to the remote device, (c) receiving the external ledger transaction from the remote device, (d) verifying the external ledger transaction, and (e) adding the external ledger transaction to the boot audit blockchain. Example B6 may also include the features of any one or more of Examples B2 through B5.

Example B7 is an apparatus according to Example B6, wherein the instructions, when executed, enable the device to (a) generate a trusted execution environment (TEE) in the device and (b) instantiate the RTM and the RTC in the TEE.

Example B8 is an apparatus according to Example B1, wherein the instructions comprise a root of trust for measurement (RTM) module and a root of trust for chaining (RTC) module. Example B8 may also include the features of any one or more of Examples B2 through B7.

Example C1 is a method to support collaborative, blockchain-based boot tracking. The method comprises (a) during boot of a first node, automatically generating a measurement of a boot module in the first node; (b) during boot of the first node, automatically generating an internal ledger transaction based on the measurement of the boot module; and (c) during boot of the first node, automatically sending the internal ledger transaction to a second node. The method further comprises (a) receiving an external ledger transaction from the second node, wherein the external ledger transaction is based on a measurement for a boot module of the second node; (b) in response to receiving the external ledger transaction from the second node, verifying the external ledger transaction; and (c) in response to verifying the external ledger transaction, adding the external ledger transaction to a boot audit blockchain.

Example C2 is a method according to Example C1, further comprising (a) automatically generating the external ledger transaction during boot of the second node and (b) automatically sending the external ledger transaction from the second node to the first node during boot of the second node. The method further comprises (a) at the second node, receiving the internal ledger transaction from the first node; (b) in response to receiving the internal ledger transaction from the first node, verifying the internal ledger transaction; and (c) in response to verifying the internal ledger transaction, adding the internal ledger transaction to the boot audit blockchain.

Example C3 is a method according to Example C1, further comprising, after adding the external ledger transaction to the boot audit blockchain, send the boot audit blockchain to the second node. Example C3 may also include the features of Example C2.

Example C4 is a method according to Example C3, wherein the method further comprises, after sending the internal ledger transaction to the second node, receiving an updated version of the boot audit blockchain from the second node, wherein the updated version of the boot audit blockchain includes the internal ledger transaction.

Example C5 is a method according to Example C1, wherein the boot audit blockchain reflects a historical order of boot module measurements for at least one device. Example C5 may also include the features of any one or more of Examples C2 through C4.

Example C6 is a method according to Example C1, wherein the method further comprises updating a platform configuration register (PCR) in a root of trust for storage (RTS) in the device, based on the measurement of the boot module. Example C6 may also include the features of any one or more of Examples C2 through C5.

Example C7 is a method according to Example C1, wherein the method further comprises (a) instantiating a root of trust for measurement (RTM) and a root of trust for chaining (RTC), and (b) using the RTM to generate the measurement of the boot module. The method further comprises using the RTC to perform the operations of (a) generating the internal ledger transaction based on the measurement of the boot module, (b) sending the internal ledger transaction to the second node, (c) receiving the external ledger transaction from the second node, (d) verifying the external ledger transaction, and (e) adding the external ledger transaction to the boot audit blockchain. Example C7 may also include the features of any one or more of Examples C2 through C6.

Example C8 is a method according to Example C7, wherein the method further comprises (a) generating a trusted execution environment (TEE) in the first node and (b) instantiating the RTM and the RTC in the TEE.

Example C9 is a method according to Example C1, wherein the operation of automatically generating a measurement of a boot module in the first node comprises automatically measuring at least one module from the group consisting of (a) a root of trust for measurement (RTM) module and (b) a root of trust for chaining (RTC) module. Example C9 may also include the features of any one or more of Examples C2 through C8.

Example D is at least one machine-accessible medium comprising computer instructions to support collaborative, blockchain-based boot tracking. The computer instructions, in response to being executed in a first device, enable the first device to perform a method according to any of Examples C1 through C9.

Example E is a data processing system with technology to support collaborative, blockchain-based boot tracking. The data processing system comprises (a) a processing element; (b) at least one machine-accessible medium responsive to the processing element; and (c) computer instructions stored at least partially in the at least one machine-accessible medium. The computer instructions, in response to being executed, enable the data processing system to perform a method according to any of Examples C1 through C9.

Example F is a data processing system with technology to support collaborative, blockchain-based boot tracking. The data processing system comprises means for performing the method of any one of Examples C1 through C9.

What is claimed is:

1. A device with support for collaborative, blockchain-based boot tracking, the device comprising:

at least one processor;
non-volatile storage responsive to the processor; and
instructions in the non-volatile storage, which, when executed by the processor, enable the device to:
instantiate a root of trust for measurement (RTM) and a root of trust for chaining (RTC);
generate, via the RTM, a measurement of a boot module of the device during boot of the device;
generate, via the RTC and during boot of the device, an internal ledger transaction based on the measurement of the boot module;
send, via the RTC, the internal ledger transaction to a remote device during boot of the device;
receive, via the RTC, an external ledger transaction from the remote device, wherein the external ledger transaction is based on a measurement for a boot module of the remote device;
in response to receiving the external ledger transaction from the remote device, verify, via the RTC, the external ledger transaction; and
in response to verifying the external ledger transaction, add via the RTC, the external ledger transaction to a boot audit blockchain.

2. A distributed computing system with support for blockchain-based boot tracking, the distributed computing system comprising:
first and second devices, wherein the first device comprises the device of claim 1, and the second device comprises the remote device of claim 1; and
wherein the second device comprises instructions which, when executed by the second device, enable the second device to:
generate the external ledger transaction during boot of the second device;
send the external ledger transaction to the first device during boot of the second device;
receive the internal ledger transaction from the first device;
in response to receiving the internal ledger transaction from the first device, verify the internal ledger transaction; and
in response to verifying the internal ledger transaction, add the internal ledger transaction to the boot audit blockchain.

3. A distributed computing system according to claim 2, further comprising:
an analyzing device with instructions which, when executed by the analyzing device, enable the analyzing device to:
perform an analysis of ledger transactions in the boot audit blockchain;
generate boot metrics, based on the analysis of ledger transactions; and
add the boot metrics to a boot analysis blockchain.

4. A distributed computing system according to claim 3, wherein:
the instructions in the analyzing device, when executed, instantiate a root of trust for archival (RTA); and
the RTA enables the analyzing device to perform the operations of (a) analyzing ledger transactions in the boot audit blockchain, (b) generating the boot metrics, and (c) adding the boot metrics to the boot analysis blockchain.

5. A device according to claim 1, wherein the instructions, when executed, further enable the device to:
after adding the external ledger transaction to the boot audit blockchain, send the boot audit blockchain to the remote device.

6. A device according to claim 5, wherein the instructions, when executed, further enable the device to:
after sending the internal ledger transaction to the remote device, receive an updated version of the boot audit blockchain from the remote device, wherein the updated version of the boot audit blockchain includes the internal ledger transaction.

7. A device according to claim 1, further comprising:
a root of trust for storage (RTS) responsive to the processor; and
at least one platform configuration register (PCR) in the RTS; and
wherein the instructions, when executed, enable the device to update the PCR, based on the measurement of the boot module.

8. A device according to claim 1, wherein the instructions, when executed, enable the device to:
generate a trusted execution environment (TEE) in the device; and
instantiate the RTM and the RTC in the TEE.

9. An apparatus to support blockchain-based boot tracking, the apparatus comprising:
at least one non-transitory machine-accessible storage medium; and
instructions in the machine-accessible storage medium, wherein the instructions, when executed by a device, enable the device to:
instantiate a root of trust for measurement (RTM) and a root of trust for chaining (RTC);
generate, via the RTM, a measurement of a boot module of the device during boot of the device;
generate, via the RTC and during boot of the device, an internal ledger transaction based on the measurement of the boot module;
send, via the RTC, the internal ledger transaction to a remote device during boot of the device;
receive, via the RTC, an external ledger transaction from the remote device, wherein the external ledger transaction is based on a measurement for a boot module of the remote device;
in response to receiving the external ledger transaction from the remote device, verify, via the RTC, the external ledger transaction; and
in response to verifying the external ledger transaction, add, via the RTC, the external ledger transaction to a boot audit blockchain.

10. An apparatus according to claim 9, wherein the instructions, when executed, further enable the device to:
after adding the external ledger transaction to the boot audit blockchain, send the boot audit blockchain to the remote device.

11. An apparatus according to claim 10, wherein the instructions, when executed, further enable the device to:
after sending the internal ledger transaction to the remote device, receive an updated version of the boot audit blockchain from the remote device, wherein the updated version of the boot audit blockchain includes the internal ledger transaction.

12. An apparatus according to claim 9, wherein the boot audit blockchain reflects a historical order of boot module measurements for at least one device.

13. An apparatus according to claim 9, wherein the instructions, when executed, enable the device to update a platform configuration register (PCR) in a root of trust for storage (RTS) in the device, based on the measurement of the boot module.

14. An apparatus according to claim 9, wherein the instructions, when executed, enable the device to:
generate a trusted execution environment (TEE) in the device; and
instantiate the RTM and the RTC in the TEE.

15. An apparatus according to claim 9, wherein the instructions comprise:
a root of trust for measurement (RTM) module; and
a root of trust for chaining (RTC) module.

16. A method to support collaborative, blockchain-based boot tracking, the method comprising:
instantiating a root of trust for measurement (RTM) and a root of trust for chaining (RTC);
during boot of a first node, generating, via the RTM, a measurement of a boot module in the first node;
during boot of the first node, generating, via the RTC, an internal ledger transaction based on the measurement of the boot module;
during boot of the first node, sending, via the RTC, the internal ledger transaction to a second node;
receiving, via the RTC, an external ledger transaction from the second node, wherein the external ledger transaction is based on a measurement for a boot module of the second node;
in response to receiving the external ledger transaction from the second node, verifying, via the RTC, the external ledger transaction; and
in response to verifying the external ledger transaction, adding, via the RTC, the external ledger transaction to a boot audit blockchain.

17. A method according to claim 16, further comprising:
generating the external ledger transaction during boot of the second node;
sending the external ledger transaction from the second node to the first node during boot of the second node;
at the second node, receiving the internal ledger transaction from the first node;
in response to receiving the internal ledger transaction from the first node, verifying the internal ledger transaction; and
in response to verifying the internal ledger transaction, adding the internal ledger transaction to the boot audit blockchain.

18. A method according to claim 16, further comprising:
after adding the external ledger transaction to the boot audit blockchain, sending the boot audit blockchain to the second node.

19. A method according to claim 18, further comprising:
after sending the internal ledger transaction to the second node, receiving an updated version of the boot audit blockchain from the second node, wherein the updated version of the boot audit blockchain includes the internal ledger transaction.

20. A method according to claim 16, wherein the boot audit blockchain reflects a historical order of boot module measurements for at least one device.

21. A method according to claim 16, further comprising:
generating a trusted execution environment (TEE) in the first node; and
instantiating the RTM and the RTC in the TEE.

22. A method according to claim 16, wherein the operation of generating a measurement of a boot module in the first node comprises:
measuring at least one module from the group consisting of:
a root of trust for measurement (RTM) module; and
a root of trust for chaining (RTC) module.

* * * * *